Jan. 20, 1959 J. HUNTER 2,869,799

MAGNETIC TAPE TRANSPORT MECHANISM

Filed March 24, 1955

INVENTOR
Jonathan Hunter
BY Clarence W. Martin 2,869,799
Patented Jan. 20, 1959

2,869,799

MAGNETIC TAPE TRANSPORT MECHANISM

Jonathan Hunter, Lafayette, Calif., assignor to Marchant Research, Inc., a corporation of California Application March 24, 1955, Serial No. 496,513
6 Claims. (Cl. 242—55.12)

This invention relates to magnetic recording and reproducing mechanisms, and more particularly concerns a small, compact tape magazine for use in such mechanisms.

In the art of magnetic tape recording and reproducing, it is necessary to drive a magnetizable tape past an associated magnetic transducing head at a substantially constant velocity in order to record or reproduce magnetic information signals without distortion. The present invention is used in a magnetic recording system wherein the tape is subjected to rapid starts and stops so that it is necessary to provide the magazine with means to prevent stretching or breaking of the tape. In all systems where the tape is transported by means of a driving wheel located between the supply and take-up reels, the start of operation of the driving wheel causes tension in the supply end of the tape and slack in the take-up end of the tape because the supply and take-up reels tend to remain stationary. Conversely, when the driving wheel is abruptly stopped, the tape between the driving wheel and the supply reel will be slack, and the tape between the driving wheel and the take-up reel will be taut because the take-up and supply reels tend to continue rotating. Elimination of such tension and slack is necessary; otherwise, the tape will break or stretch and will not pass the transducing head at a constant speed.

Former known shock absorbers for eliminating slack and tension have been of relatively large size and cost, and have the further disadvantage that the tape must be threaded and unthreaded about the shock absorber each time the tape and reels are used and removed. One such type of shock absorber is disclosed by Kenneth M. Rehler in his article "The Raydac System and Its External Memory" which appears in Review of Input and Output Equipment Used in Computing Systems, published by the American Institute of Electrical Engineers, New York, March 1953. This shock absorber comprises a plurality of idler wheels, rollers and guides, and a slidable carriage upon which some of the idler wheels are mounted. The slidable carriage moves along the guides in response to tape tension differentials, thereby supplying tape and taking up slack as required.

According to this and other prior arrangements, threading and unthreading of the tape necessitates handling; hence, the tape is exposed to foreign particles which could easily adhere to it. Also, the tape is exposed to foreign particles during its travel from the supply reel to the shock absorber, the transducer, the driving wheel and back to the take-up reel. In magnetic tape recording and reproducing wherein the tape runs in contact with the transducer, the presence of even very small foreign particles on the tape can easily cause the loss of information due to the increased spacing between tape and transducer.

Furthermore, according to prior arrangements, information is tape recorded with a first transducer and is then reproduced by a second transducer, thus creating a problem of signal distortion. During recording, the first transducer is in a particular alignment with the tape and has certain innate characteristics; e. g., in a magnetic transducer head, the pole faces are not percisely the same distance apart from one end of the air gap to the other. If the information is reproduced using a second transducer, the transducer alignment and characteristic may be different from the first transducer; in fact, even if the recording transducer is used for reproduction, there will be some variance in alignment since it is virtually impossible, during reproduction, to replace the transducer and tape in precisely the same relative positions which they had during recording. Both the differences in alignment between tape and transducer, and the different characteristics of the transducers contribute to signal distortion.

The present invention overcomes the problem of tape tension differentials and the problem of signal distortion in the following manner. A resilient member is provided as a shock absorber and tensioning device which equalizes tape tension differentials throughout the length of the tape. It also prevents stretching and breaking of the tape during very rapid starts and stops, and eliminates tape vibration and jerks. The tape is loaded into a magazine comprising the reels, the driving means, a tape tension shock absorber, and a transducer. The magazine is then sealed to exclude foreign particles and to eliminate further handling of the tape. The shock absorber is simplified and compact and therefore permits the creation of a single magazine having all the necessary components. Also, the transducer is permanently attached to the magazine; therefore, information is recorded on the tape within the magazine, and the information is reproduced using the same transducer which was used for recording. This eliminates distortion which would otherwise be present due to characteristic differences in transducers and variation in alignment between tape and transducer.

It is, therefore, a primary object of the present invention to provide an improved tape transport mechanism.

Another object is to contain the components of a tape transport in a small, easily handled, compact tape magazine that may be sealed to exclude foreign matter.

Still another object is to place the shock absorber in straddling relationship to the reels and make feasible the construction of a small, compact tape transport magazine.

A still further object is to provide a tape magazine comprising a novel shock absorber to maintain a constant tape tension.

Another object is to reduce signal distortion to a minimum by maintaining substantially identical relative positions of components during recording and reproduction.

An additional object is to prevent the tape from stretching or breaking during very rapid starts and stops of the tape.

Other objects of the invention will be apparent from the following detailed description in which reference is made to the accompanying drawings, wherein.

Figure 3:
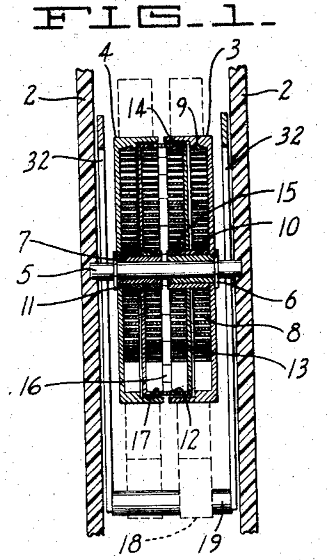
Fig. 3 is a left side view in section taken along lines 3—3 of Fig. 1 showing a spring connection between the supply and take-up reels.

The tape transport and transducing mechanism is enclosed in a housing comprising a main supporting body 1 (Fig. 1) to which the front and back walls 2 are fixed. If desired, one or both of the walls 2 may be made of transparent material as shown. A supply reel 3 and a take-up reel 4 are mounted in side-by-side relation on a shaft 5 which is supported in bearing surfaces in the sidewalls 2 (Fig. 3). Reels 3 and 4 are held in place on shaft 5 by suitable spring clips 6. Respective bushings 7 are pressed into and solidly imbedded in reels 3 and 4, and are freely mounted on shaft 5.

Figure 3A:
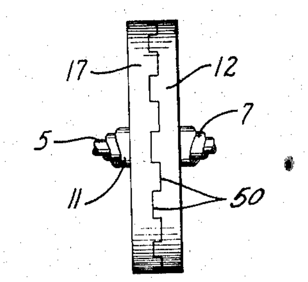
Fig. 3A is a left-side view of a portion of the mechanisms shown in Fig. 3.

The rotation of one reel tends to rotate the other reel by means of the following mechanism. One end of a coil spring 8 is fastened at 9 to reel 3 and the other end of spring 8 is fastened at 10 to a collar 11 which is freely mounted on bushing 7. An inner wheel 12 is freely mounted on collar 11 and a coil spring 13 is connected to the flange of the wheel at 14. The other end of spring 13 is fastened at 15 to the collar 11. A round, stiff disc 16 fits into the flange of the inner wheel 12 adjacent spring 13 to hold inner wheel 12 in rounded shape against the force of spring 13. This arrangement provides a spring connection between reel 3 and the inner wheel 12. Wheel 12, in turn, transmits motion to a corresponding wheel 17 (Fig. 3A) through a plurality of clutch teeth 50. Inner wheel 17 transmits the motion to reel 4 through coil spring interconnections identical to the ones described above in relation to reel 3 and wheel 12. During the loading of tape into the magazine, the spring connected reels 3 and 4 are pre-loaded to a point where further loading does not substantially increase the reaction force so that the relative rotation of the reels is against the substantially constant force of the springs.

The path of tape 18 (Fig. 1) as it moves from reel 3 to reel 4 is controlled by a shock absorber, and a series of rollers and guide blocks in such manner that the tape is guided from the plane of one reel past a transducing head and a tape driving means, and is then guided into the plane of the second reel, all without laterally bending the tape.

The progressive stages of the tape 18 as it moves from reel 3 to reel 4 are identified by the numbers 18*a*, 18*b*, 18*c*, etc. The tape 18*a* moves off of reel 3 and doubles back around a roller 19. The latter is long enough to support two tape portions 18*a* and 18*i* in side-by-side relationship, and could as well be two rollers, as will become clear below. Roller 19 comprises a portion of a shock absorbing mechanism described hereinafter. From roller 19, the tape 18*b* progresses around an idler wheel 20 which is freely mounted on a shaft 21 suitably fixed to the magazine 1. From idler wheel 20, tape 18*c* travels through an open slot or trough 22 in a highly polished guide block 23 and then to an idler wheel 24 which is mounted in a manner similar to the idler wheel 20.

After moving around idler 24, the tape 18*d* moves through a lower slot 25 of the tape guide block 23, and upon emerging from the latter, the tape 18*e* is twisted 90° and passes over a vertical pin 26. Pin 26 is fixed to the main supporting body 1 and the surface of the pin over which the tape moves is in the same plane as the midpoint of the tape path on roller 24. The tape 18*f* then moves past the transducing head 27 and is engaged by a tape driving wheel 28. The transducer head 27 is permanently attached to the magazine 1. The face of the transducer is in a plane slightly behind the level of a plane defined by the front surface of the pin 26 and the driving wheel 28 so that the transducer head 27 exerts a pressure on the tape and is in constant contact with the tape.

The driving wheel 28 is mounted on a shaft which is journalled between a protrusion 29 and the magazine 1. An input gear 30 is fixed on the shaft which carries the drive wheel 28. After moving past the driving wheel 28, the tape 18*g* is twisted back 90° and then enters the lower slot 25 of the tape block 23 in side-by-side relationship with tape 18*d*. Upon leaving the guide block 23, the tape 18*h* moves around an idler wheel 31 which is mounted on the same axis as idler 24. The tape 18*h* next moves through the upper slot of tape guide slot 22. From the guide slot the tape 18*i* progresses to roller 19, and then travels around roller 19 to the reel 4, thereby completing its journey from reel 3 to reel 4.

It should be noted that the diameter of the driving wheel 28 is equal to the distance between the midpoints of the tape paths on the idlers 24 and 31; this diameter is also equal to the distance between the midpoints of the tapes on reels 3 and 4. Thus, the tape 18 is transported from one reel to the other over the route described without laterally bending the tape.

In the foregoing description, the transducer 27 was disclosed as being located at a specific position between the pin 26 and the tape driving means 28. It will be obvious to those skilled in the art, however, that the transducer could also be effectively located at various other positions for cooperation with the tape 18*c*, 18*d*, 18*g* or 18*h*.

Figure 2:
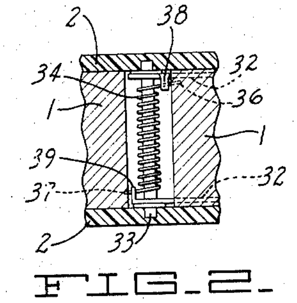
Fig. 2 is a top view taken along the lines 2—2 of Fig. 1 and showing the double-acting spring of the shock absorber.

The shock absorber, which eliminates slack and tension in the tape, comprises the following mechanism. Roller 19 is mounted on a shaft 19*a* carried by a pair of arms 32. The latter are pivotally mounted on a fixed shaft 33 and straddle the reels 3 and 4. This arrangement permits the arms 32 to be of sufficient length to describe substantially a flat arc and yet able to fit within the magazine 1. A coil shock spring 34 (Fig. 2) is wound around the shaft 33 and is held under tension by contact of the ends 36 and 37 of the spring with the inner side of the magazine 1. Ears 38 and 39 on the two respective arms 32 overlie the ends 36 and 37 of the spring. When the shock arm 32 is moved in either direction from the initial position shown, one or the other of the ears 38 or 39 picks up the spring end 36 or 37 and torsionally loads the spring. This spring arrangement permits the use of only one spring which acts in two directions and normally holds the arms 32 in a centralized position. During assembly, the shock spring 34 is pre-loaded so that the arms 32 operate against a substantially constant predetermined force that acts instantaneously when the shock arms are moved in either direction from the centralized position.

Figure 1:
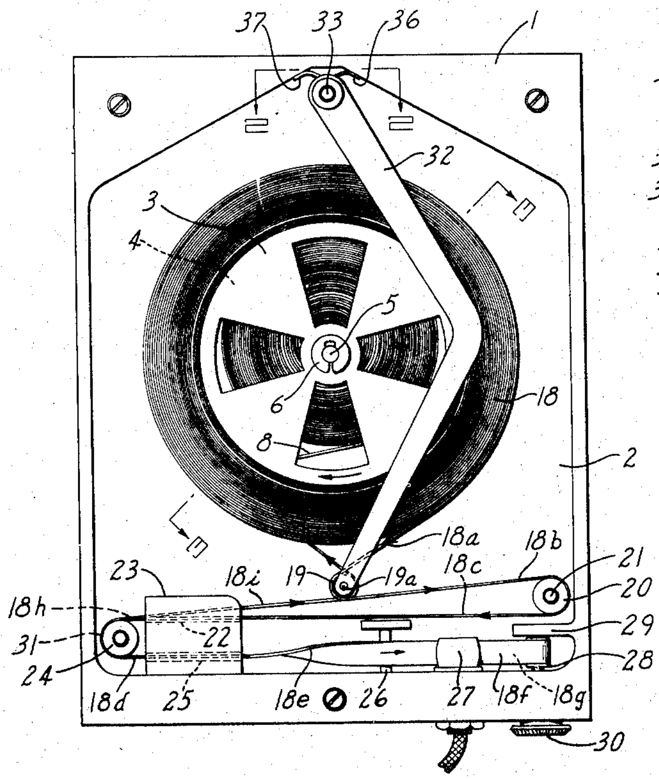
Fig. 1 is a front view of the complete tape magazine.

As an example of the operation of the shock absorber, power is applied to gear 30 which rotates driving wheel 28 and imparts motion to the tape 18 so as to pull tape off of reel 3 in a clockwise direction (indicated by arrow at Fig. 1). Because of their inertia, the reels tend to resist movement; therefore, the tension of the supply tape 18*a* coming off of reel 3 tends to increase and the take-up tape running onto reel 4 tends to be slack. The increased tension on tape 18*a* starts reel 3 rotating while reel 4 tends to remain stationary; however, energy stored in the interconnecting springs between reels 3 and 4 causes reel 4 to rotate and follow reel 3. Meanwhile, the take-up tape 18*i* tends to be slack and the supply tape 18*a* tends to be taut; therefore, tape 18*a* forces the shock arm 32 to the right, thereby reducing the tension in the supply tape and removing the slack in the take-up tape. Rightward movement of the shock arm causes the spring 34 to be torsionally loaded an additional amount. This loading is available to return the arm to the centralized location. The spring 34 exerts a force back through the deflected arms 32 and tape to the reels. This force tends to counteract the inertia of the reels. As the reels come up to speed, the shock spring 34 returns the arm 32 to its neutral position thereby re-establishing equilibrium in the system.

Conversely, when the reels are rotating and the driving wheel is abruptly stopped, the inertia of the reels tends to maintain the rotation thereof so that the tape moving off of reel 3 tends to be slack and the tape moving on to reel 4 tends to be tensioned. Because of the tendency for tension differentials to exist between the supply tape and the take-up tape, the shock absorber arm moves to the left thereby increasing the tension of the tape coming off of reel 3 and decreasing the tension of the tape moving on to reel 4. After the reels are stopped, the shock spring 34 returns the shock absorber 32 to the neutral position thereby re-establishing equilibrium throughout the system. By the use of this shock absorber, the rapid starts and stops of the tape do not cause stretching or injury to the tape.

It will readily be observed that if the reels 3 and 4 were fixed to the shaft 5 and driven by this shaft in timed relation with the driving wheel 28 to move the tape from one reel to the other past the transducing head, the shock arm 32 would serve not only to take up the initial tension and slack in the tape, but would also serve to maintain equal tension upon the supply and take-up tapes as the effective diameter of one reel increases and effective diameter of the other decreases. This arrangement, however, would require an extreme arcuate movement of the shock absorber arm, thus increasing the overall size of the tape magazine 1. Applicant has therefore combined the action of the shock arm 32 with the interconnecting spring mechanism between the reels 3 and 4 to obtain a combination which operates in a state of equilibrium with a minimum movement of the shock arm 32. The simplicity of the device makes it possible to permanently associate a single shock absorbing mechanism with a pair of reels in combination with a transducing head which is permanently associated with each pair of reels, thus maintaining the entire structure compact for easy storage of the same and, furthermore, obtaining the advantage that the reading and writing quality of the transducing head is maintained constant for the tape carried by any one pair of reels.

I claim:

1. In a tape transport comprising a tape, a supply reel and a take-up reel mounted for rotation upon a common pivot, drive means for pulling the supply tape off of the supply reel, a resilient mechanism interconnecting the two reels and operable to cause the take-up reel to follow the rotation of the supply reel; a shock absorber comprising: a supporting member mounted for pivotal movement upon an axis parallel to the axis of rotation of the reels, a roller pivotally mounted on the supporting means for rotation on an axis parallel to the axis of rotation of the reels, the pivot for the roller normally standing in such position that a line passing through the pivots for the supporting member and the roller substantially passes through the pivot for the reels, said roller being of sufficient width to receive the supply tape and the take-up tape, means to guide the supply tape and the take-up tape in opposite directions from the roller so that rocking movement of the supporting member and the roller in a direction to relieve tension in the supply tape will eliminate slack in the take-up tape, and resilient means for returning the supporting member and the roller to their normal position.

2. A tape transport comprising a supply reel having tape wound thereon, a take-up reel coaxial with said supply reel and having tape wound thereon in a direction the reverse of the supply reel, a resilient connection between the reels for compensating for effective reel diameter differential, tape tension equalizing means comprising a roller mounted to move in a plane substantially tangential to said reels and urged to maintain a median location, tape guide means for directing the supply tape in a predetermined direction about said roller to begin a loop formed by the supply and take-up portions of the tape, tape guide means for directing the take-up tape in the same predetermined direction about said roller to close said loop, and tape driving means located in said loop formed by the supply and take-up portions of the tape.

3. In a tape magazine comprising a housing, a supply reel and a take-up reel which are mounted for rotation upon a common horizontal axis in said magazine, a tape carried by said reels, a transducer fixed within said magazine, and means for guiding the tape in a loop from the supply reel past the transducer to the take-up reel including: a tape tension equalizing arm pivotally mounted on a horizontal axis, resilient means connected to said equalizing arm for urging said arm to a centralized location, tape guide means carried by said arm for directing said tape as it begins and ends said loop, a pair of idler wheels mounted upon respective horizontal pivots fixed to said housing and operable to change the direction of tape motion in said tape loop by substantially 360°, and a drive means mounted upon a vertical axis about which drive means the tape passes and changes direction by substantially 180°, said drive means having a diameter substantially equal to the distance between the midpoints of the widths of the tapes on said reels.

4. A tape transport comprising: a tape; a supply reel and a take-up reel mounted upon a common axis and having said tape threaded in a loop therebetween; a resilient spring interconnecting said reels for causing the reels to angularly follow each other; a tape driving wheel located in said tape loop between said reels and characteristically causing undesirable tension differential in said tape; a shock absorber mechanism for guiding the tape at substantially the beginning and end of the tape loop and operable in response to tension differential to pivot and relieve said tension; and means to restrain the tape to move in a predetermined path in said loop comprising, guide means carried by said shock absorber mechanism at substantially the beginning of said loop, a first idler in the tape loop after said guide means, said tape driving wheel in the tape loop after said first idler and supported on an axis disposed 90° to the idler axis, said driving wheel diameter substantially equaling the distance separating the midpoints of the widths of the tapes on said reels, a second idler coaxial with said first idler in the tape loop after said driving wheel, a third idler in the tape loop after said second idler, and guide means carried by said shock absorber mechanism at substantially the end of said tape loop.

5. A tape magazine comprising: coaxially mounted supply and take-up reels carrying portions of an elongated tape, said tape being wound in a clockwise direction on one reel and in a counterclockwise direction on the other reel; a tape loop between the reels; a driving wheel located in the tape loop; means operable upon the application of power to said driving wheel to commence the undistorted transduction of data on said tape substantially at the moment of application of power; and means operable to relieve tension in said tape introduced at the moment of application of power and operable to urge said reels to angularly move, comprising a member pivotally mounted on said magazine, resilient means connected to the member for urging said member to a centralized location, and guide means carried by said member for guiding the tape as said tape is driven in said tape loop.

6. A tape magazine comprising: a supply and a take-up reel coaxially mounted in said magazine; at least one resilient coiled spring connected between the reels for exerting a substantially constant torque between said reels; a tape tension equalizing member pivotally mounted on said magazine and having at least one arm extending adjacent said reels; a roller carried by said arm; a tape constrained to move in a path from said supply reel to said take-up reel, said path defined by first passing said tape around said roller to a first idler wheel, then passing said tape from the first idler wheel to a driving wheel, then passing said tape from the driving wheel to a second idler wheel, and thereafter passing said tape from the second idler wheel around said roller to said take-up reel; means to apply and remove driving power at said driving wheel causing reflection of said tape tension equalizing member; and a centralizer spring cooperating with said tape tension equalizing member for causing restorative movement of said member.

References Cited in the file of this patent

UNITED STATES PATENTS

| | | |
|---|---|---|
| 2,321,812 | Heller et al. | June 15, 1943 |
| 2,477,146 | Scherbatskoy | July 26, 1949 |
| 2,526,051 | Shrader | Oct. 17, 1950 |
| 2,609,998 | Sear | Sept. 9, 1952 |
| 2,656,129 | De Turk et al. | Oct. 20, 1953 |
| 2,668,021 | Gleason | Feb. 2, 1954 |
| 2,745,604 | Masterson | May 15, 1956 |